Feb. 3, 1953 J. W. BARNES 2,627,180
NAVIGATIONAL INSTRUMENT
Filed Feb. 26, 1948 2 SHEETS—SHEET 2

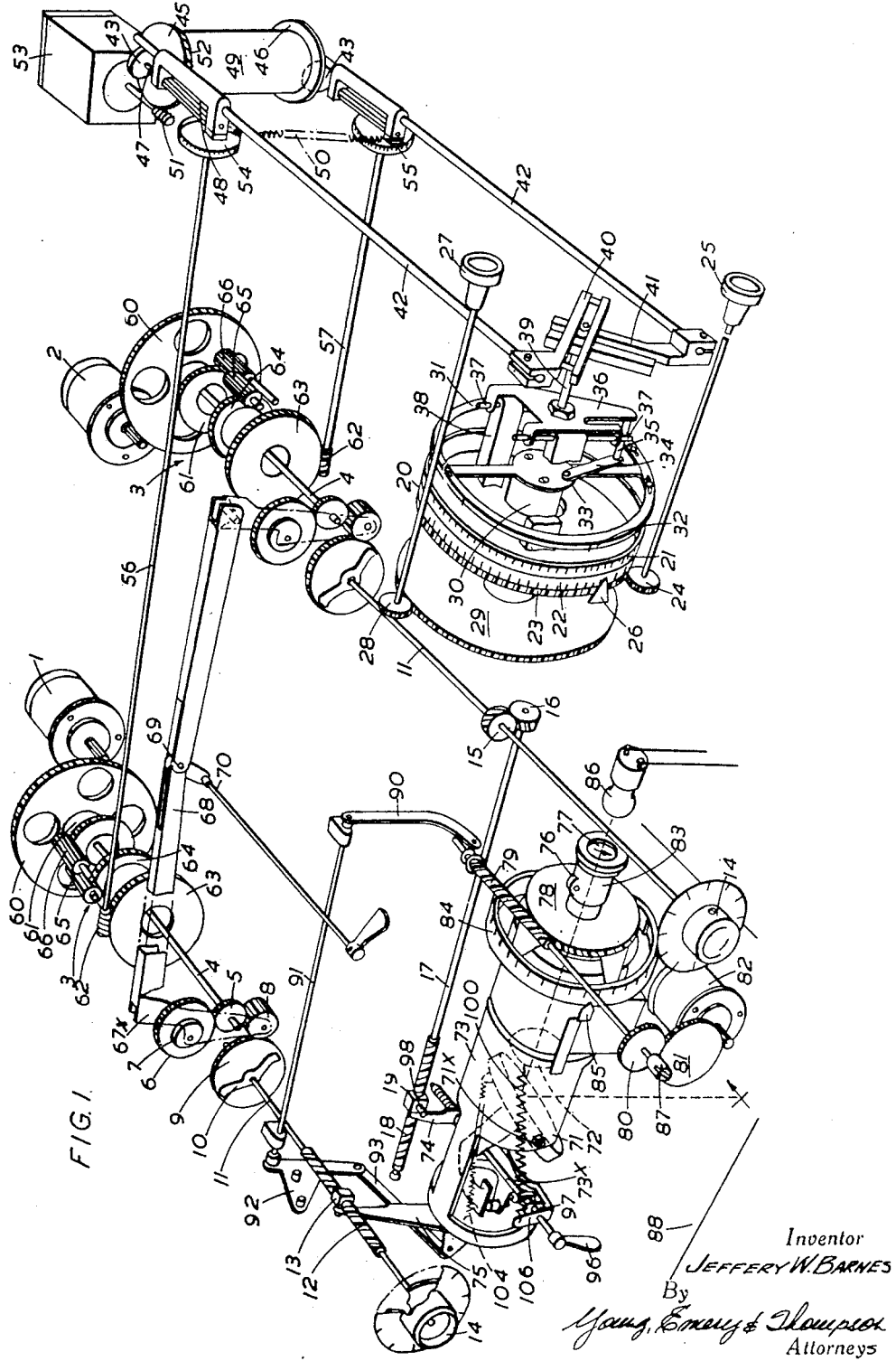

Inventor
JEFFERY W. BARNES
By
Young, Emery & Thompson
Attorneys

Patented Feb. 3, 1953

2,627,180

UNITED STATES PATENT OFFICE 2,627,180

NAVIGATIONAL INSTRUMENT

Jeffery Walton Barnes, Farnborough, England, assignor, by mesne assignments, to Kelvin & Hughes Limited, Glasgow, Scotland, a British company Application February 26, 1948, Serial No. 11,141
In Great Britain June 19, 1945

Section 1, Public Law 690, August 8, 1946
Patent expires June 19, 1965

4 Claims. (Cl. 73—178)

This invention relates to navigational or position-indicating instruments and refers more particularly to instruments intended for use in aircraft for giving an indication of the position of the aircraft relatively to the earth's surface.

It is known to provide aircraft with apparatus for indicating air position in which an element driven proportionally to the distance travelled is combined with an element driven according to the direction of travel, so as to resolve the distance travelled into cardinal components and thus determine the distance travelled in any direction, such as north-south and east-west. One form of such apparatus, known as an air position indicator is described in British patent specification No. 558,619. Such apparatus incorporates a mechanism which is driven proportionally to the distance travelled in a north-south direction and another mechanism which is driven proportionally to distance travelled in an east-west direction.

The object of this invention is to provide an instrument which can be used in conjunction with such an air position indicator for indicating the position of the aircraft relative to the earth's surface by plotting the position on a map or chart.

According to this invention the instrument comprises, elements adapted to be driven proportionally to cardinal components of air distance from a starting or datum point, a device for resolving wind speed and direction into cardinal components mechanism for adding the cardinal components of wind speed and direction to the corresponding components of air distance to produce combined cardinal component value proportional to the movement of the aircraft relative to the earth's surface and two members, one of which is adapted to carry a map or chart and the other carrying a pointer, one of which members is adapted to be moved to by said mechanism proportionally to the combined cardinal component values of movement relatively to the earth's surface.

In a preferred form the instrument comprises elements driven proportionally to cardinal components of the distance travelled relative to the air, a vector resolving mechanism adapted to be set in accordance with wind speed and direction and to resolve the wind speed and direction into cardinal components, co-ordinating mechanism driven by said elements and said vector resolving mechanism for combining the cardinal components of air distance with the respective cardinal components of wind speed and direction to give cardinal components of distance relative to the earth's surface, a cylindrical member and a support for a map or chart, said member having a pointer adapted to be moved by said co-ordinating mechanism in accordance with the cardinal components of distance relatively to the earth's surface to give indication of position on the map or chart.

The pointer may also be movable to maintain it in line with the aircraft heading and thus indicate on the map or chart the direction in which the aircraft is travelling.

Preferably, the pointer consists of a beam of light formed by an optical projector having a light source, a graticule and a lens adapted to project by a light beam, a graticule image on the map or chart and means driven by said coordinating mechanisms for deflecting the light beam proportionally to the cardinal components of distance relative to the earth's surface, so that the graticule image indicates position on the map or chart.

The invention will be more clearly understood by reference to the drawings accompanying the provisional specification in which:

Fig. 1 is schematic diagram of the instrument.

Figure 3:
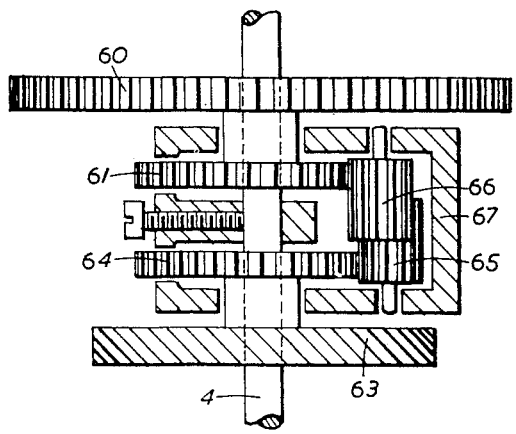
Fig. 3 is a sectional plan of the differential gearing.

In order that the two elements which are to be driven proportionally to the distance travelled relative to the air can be conveniently actuated from the mechanisms in the air position indicator previously referred to, two electrical step-by-step transmitters of well-known form are located in the air position indicator and are driven by two shafts of said mechanisms whose rotational speeds are proportional respectively to the north-south and east-west components of the distance travelled. Although it is convenient to use such transmitters, it will be appreciated that this method of transmitting the drive from the air position indicator to the elements of an instrument according to this invention are not essential, as the required motions could be transmitted by other means as, for instance, flexible driving cables.

In the illustrated embodiment however, electrical transmitters of the type mentioned are used and these are connected by electrical wires to repeater motors 1, 2. One of these repeater motors marked 1 is driven proportionally to the distance travelled in a north-south direction and the other marked 2 is driven proportionally to the distance travelled in an east-west direction.

These repeater motor drive mechanisms which are substantially identical in form and the mechanism driven by the repeater motor 1 will be specifically described, like parts in the mechanism driven by the repeater motor 2 being indicated by like references.

The motor 1 drives through a differential gear 3, the output shaft 4 carrying a pinion 5 forming part of a gear train 6 comprising a large gear wheel 7 and a small gear wheel 8 meshing with the pinion 5. Either of these gear wheels 7 or 8 can be shifted into driving engagement with the gear wheel 9 which is connected through a clutch 10 to a shaft 11 formed with a lead screw 12 driving a nut 13. On an extension of the shaft 11 a setting knob 14 is provided to enable the mechanism to be manually set to a starting or datum point.

As previously stated the mechanism driven by the motor 2 is similar to that driven by the motor 1 but the shaft 11 instead of carrying the lead screw has a driving connection through gear wheels 15 and 16 with a shaft 17 arranged at right angles to the shaft 11, the shaft 17 carrying a lead screw 18 for driving a nut 19.

The wind speed and direction setting and vector resolving mechanism comprises a drum 20 bearing two scales, one of which is a wind speed scale 21 and the other a wind direction scale 22, both engraved on the same drum. The drum is driven by a gear wheel 23 fixed thereon meshing with a pinion 24 which is rotated by means of a knob 25 to set wind direction in the scale 22 against a fixed pointer 26. The wind speed setting knob 27 drives through a pinion 28, a gear wheel 29 fixed to a spindle 30 extending axially through the drum 20 and having a ring 31 mounted so as to rotate with the gear wheel 29, said ring carrying datum lines 32, five of which are provided equally spaced around the ring 31, so that one of these datum lines is always visible for any setting of wind direction. The knob at 27 is rotated until one of the datum lines 32 is opposite to the wind speed on the scale 21. Thus the drum 20 carrying the said two scales is set according to wind direction and with the wind speed scale 21 positioned according to wind direction, the ring 31, in being rotated to bring its datum line 32 against the wind speed value on scale 21 will be moved proportionally both to the wind direction and to wind speed. A stud 33 on the frame of the ring 31 and eccentrically located to the axis of the ring is connected by a link 34 to a second stud 35 fixed to a plate 36. The plate 36 is slidably mounted on guide rods 37 extending from blocks 38 fixed to the drum 20. The link 34 thus slides the plate 36 along the rods 37 when the ring 31 is rotated. The plate 36, which is rotated with the drum 20 and also displaced by the link 34, carries a wind operating pin 39 which is caused by said movement of the plate 36 to describe an arc of a circle and to be moved into a position which is determined both by the setting of the drum 29 in accordance with wind direction and the setting of the ring 31 in accordance with wind speed. Consequently, the position of the wind operating pin 39 will be determined by both wind speed and direction and will represent the wind vector. To resolve the north-south and east-west components of the wind from the position of the wind operating pin 39 representing the wind vector, a known form of vector resolving mechanism comprising two slotted bars 40, 41 are provided arranged mutually at right angles to each other and engaging the wind operating pin 39. The mechanism is assembled so that when a wind direction from north-south is set, the guide rods 37 for the sliding plate 36 are parallel to the east-west slotted bar 41, and thus as wind speed is set the wind operating pin 39 moves in this slot without causing any movement of the slotted bar 41. Each slotted bar 40 or 41 is fixed to a slide rod 42 which is mounted to slide in an axial direction. Thus the movement of one of the rods is proportional to the east-west component and the movement of the other rod is proportional to the north-south component of the wind speed.

The slide rods 42 control the position of friction wheels 43 contacting the upper and lower discs 45, 46, the wheels 43 and the discs 45, 46 constitute an infinitely variable gear. Each wheel 43 is mounted on a shaft 47 to which is fixed a long pinion 48 carried by the shaft 49. The wheels 43 are spring loaded on to the surface of the discs 45, 46 by the tension spring 50 extending between the shaft 49.

The discs 45, 46 are locked together and driven at a constant speed by means of a worm 51 and a worm wheel 52, the worm being driven from a constant speed motor 53.

The effective lengths of the slide rods 42 are adjusted so that for zero wind setting the contact points of the wheels 43 coincide with the centre of the discs 45, 46. When wind speed and direction are set, slide rods 42 position the wheels 43 on the surface of the discs 45, 46 until the displacement of the wheels from the disc centres is proportional to the two cardinal components of the wind. Since the discs 45, 46 are driven at constant speed, the rotation of the wheels 43 is respectively proportional to the north-south and east-west components of the wind and hence he number of rotations of the wheels 43 and the long pinions 48 will be proportional to the north-south and east-west components of the wind. The rotation of the wheels 43 are transmitted by way of the long pinions 48 to the contrate wheels 54, 55 and thence through the shafts 56, 57 to the differential gears 3.

The two differential gears indicated generally at 3 which combine the cardinal components of air distance with the cardinal components of wind are of the planet type. The mortars 1 or 2 rotate a gear wheel 60 which in turn rotates a gear wheel 61, there two gear wheels rotating freely on the output shaft 4. A worm 62 on the shaft 56 or 57 rotates a worm wheel 63 which in turn rotates a gear wheel 64, and the worm wheel 63 and 64 also rotate freely on the output shaft 4. Two planetary wheels 65, 66, one of which meshes only with the gear wheel 61 and the other which meshes only with the gear wheel 64 are mounted in a cage 67 which is fixed to the output shaft 4, thus the cage is rotated and with it the output shaft 4 at half the algebraic sum of the movements imparted by the worm 62 and the motor 1 or 2. The differential gears thus compound the component of air mileage from the motors with the component of wind mileage from the vector resolving mechanism and rotate the shaft 4 proportional to ground mileage.

The gear train 5, 6, 7 and 8 is mounted on a flat plate 67* which is pivoted about the shaft 4, so that it can be rocked about the axis of the shaft 4 into either of two positions, in one of which the gear wheel 7 meshes with the gear wheel 9 and the other in which the gear wheel 8 meshes with the gear wheel 9. The plate 67* is rocked by means of the double links 68 pivoted at 69 to a gear selector lever 70. This change speed gearing enables the device to be used with either small or large scale maps of the type which will be hereinafter referred to.

From the foregoing, it will be understood that the lead screws 12 and 18 will be driven by the mechanisms previously described by amounts proportional to distance travelled relative to the ground in an east-west direction and in a north-south direction respectively, and these rotary movements will move the nuts 13 and 19 by corresponding amounts.

Figure 2:
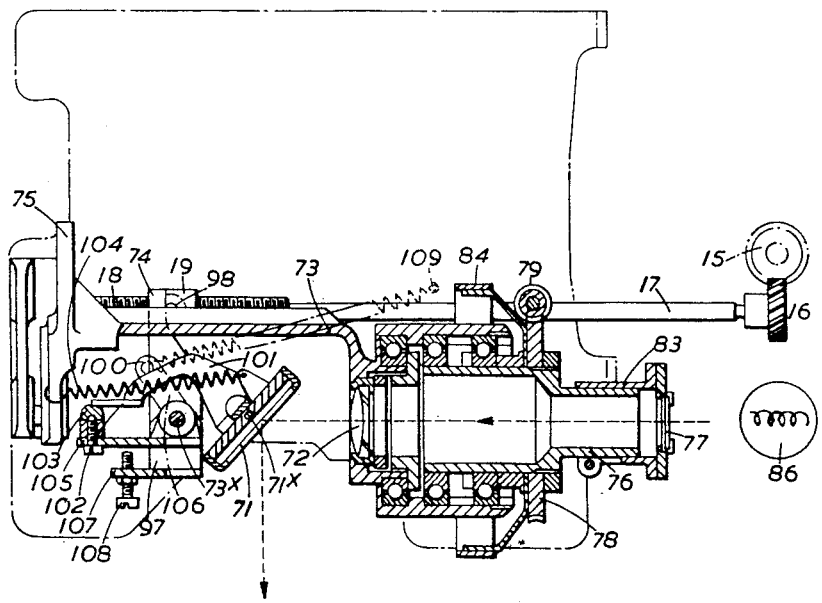
Fig. 2 is a sectional elevation of the projector system.

The optical projector shown more clearly in Fig. 2 comprises a reflecting mirror 71 and a lens 72, both of which are mounted in the cylindrical mirror tube 73. The mirror 71 is pivoted at 71* in bearings carried in the mirror tube 73 and is operated by an arm 101 terminating in a flat surface 102 extending parallel to the pivot axis 71* but offset from the said pivot axis by an amount equal to the radius of the ball 103 with which the surface 102 is held in contact by the spring 104. The ball 103 is carried on an arm 105 made fast to the shaft 73* which shaft rotates in bearings fixed to the frame of the instrument (not shown).

The bracket 97 which is free to turn on the shaft 73* carries an arm 74 normally contacting a peg 98 on the nut 19, and carries a second arm 106 to which the spring 100 is attached and a third arm 107 for an adjustable screw 108 which normally touches the arm 105. The spring 100 is anchored to the frame of the instrument at 109.

The spring 104 applies a torque to the mirror 71 which ensures that normally the surface 102 on the arm 101 touches the ball 103 and that the arm 105 touches the screw 108, but this torque is insufficient to lift the arm 74 from the peg 98 against the pull of the spring 100.

Since the distance between the centre of the ball 103 and the axis of the shaft 73* is equal to that between the axis of the shaft 73* and the axis 71*, when the tube 73 is in its central position and the axis 71* is parallel to the shaft 73*, the mirror will move through half the angle moved through by the arm 105. Also, since the reflected rays from the mirror 71 turn through twice the angle turned through by the mirror 71 about the axis 71* it follows that the reflected rays move through the same angle as the arm 105. If with the mirror in any other position than the 45° angle the tube 73 be rotated about its axis with the mirror locked to the tube 73, the reflected rays would trace a hyperbola on the chart 88, and as a straight line trace is required the ball 103 and flat surface 102 connection between the arms 101 and 105 was specially designed to give small rotation of the mirror about its axis 71* when the tube 73 is rotated to give a linear trace of the rays on the chart. In the particular position illustrated in which the mirror is at 45° to the optical axis and in which the reflected rays from the mirror 71 are at right angles to the rays from the lens 72 no such small rotation of the mirror is required and is not given by the arrangement described and illustrated because in this particular position the ball is located on the optical axis of the light source. The mirror tube 73 is mounted so that it can rotate about its axis for north-south traverse which is communicated to the tube by an arm 75 connected to the nut 13.

A tube 76 carrying a graticule 77 is mounted coaxially with the mirror tube and is rotatable by a worm wheel 78 driven by a worm 79 and gearing 80, 81 from a compass repeater motor 82 of known type which rotates the graticule tube, so that the graticule will indicate when projected by the mirror the aircraft heading relatively to the map or chart. Preferably, the graticule 77 is not mounted directly on the graticule tube but is mounted on an adjustable sleeve 83 which is clamped to the graticule tube. Rotation of the sleeve 83 enables the graticule image to be synchronised with a course scale 84 used in conjunction with a fixed pointer on the mirror tube to indicate the course being taken. Axial adjustment of the sleeve 83 enables the graticule image to be focussed.

The graticule 77 is directly illuminated by means of a lamp 86 and projects an image of the graticule through the lens 72 on to the mirror 71 for which it is reflected on to the map or chart 88 carried by a table beneath the mirror tube 73.

To obtain syncronisation with the compass controlling the repeater motor 82, the gear wheel 80 is formed with a slotted spindle 87, so that the gear wheel 80, worm 79, worm wheel 78 and the graticule tube can be rotated until the course scale indication is correct. The worm 79 is carried on a splined shaft and small angles of rotation of the graticule may be effected, in addition to those produced by the repeater motor 82 by sliding the worm along the splined shaft. The position of the worm 79 on the worm shaft is controlled by a compensating lever system, including the arm 90, the shaft 91, the arm 92 and the link 93 connected to the mirror tube 73 so that the north-south rotation of mirror tube is added to the normal compass rotation of the graticule. Without this compensating mechanism the graticule image would rotate as it traverses the map in a north-south direction and the arrow head would then no longer indicate the aircraft heading. The whole instrument is intended to be fixed in the aircraft at a definite height above the navigator's table indicated at 88 which will carry the map on which the ground position is to be indicated by the graticule image projected as hereinbefore described. A suitable type of map is that known as a conical orthomorphic projection. The map must be aligned with respect to the axis of the projector and to facilitate this the graticule image projected from the mirror 71 can be rapidly traversed in alignment with the projector axes by the operation of a traversing lever 96 fixed on the pivot 73*. The bracket 97 carrying the arm 74 is so arranged that by operating the lever 96 the arm 74 can be moved laterally against the spring 100 out of contact with the pin 98 to allow the mirror 71 to be swung counter-clockwise in the direction of the axis of the tube 73 while the mirror 71 can be swung clockwise by rotating the lever 96 against the action of the spring 104, in which case the arm 105 moves away from the screw 108.

I claim:

1. In a navigational instrument having output members driven proportional to the combined air distance and wind speed in north-south and east-west directions respectively, a stationary map, an optical projection mechanism above said map having a rotatable cylindrical mirror tube, a reflector pivotally mounted in said tube and rotatable therewith, a lens mounted in said tube, an adjustable graticule tube mounted coaxially with respect to said mirror tube, a source of light for projecting the graticule image on said reflector so as to project said image on said map, means operable with a repeater compass to rotate said graticule so as to indicate on the map the aircraft heading, means driven by one output member for rotating the cylindrical mirror tube proportional to the compensated distance traversed in a north-south direction, and means driven by the other output member for pivoting said reflector within said tube proportional to the compensated distance traversed in an east-west direction.

2. In a navigational instrument having output members driven proportional to the combined air distance and wind speed in north-south and east-west directions respectively, a stationary map, an optical projection mechanism above said map having a rotatable cylindrical mirror tube, a reflector pivotally mounted in said tube and rotatable therewith, a lens mounted in said tube, an adjustable graticule tube mounted coaxially with respect to said mirror tube, a source of light for projecting the graticule image on said reflector so as to project said image on said map, means operable with a repeater compass to rotate said graticule so as to indicate on the map the aircraft heading, means driven by one output member for rotating the cylindrical mirror tube proportional to the compensated distance traversed in a north-south direction, means driven by the other output member for pivoting said reflector within said tube proportional to the compensated distance traversed in an east-west direction, and means for imparting a small additional rotation to said reflector about its pivotal axis when said mirror tube is rotated so as to give a linear trace to the rays projected on the map.

3. In a navigational instrument a lens system, a reflector, means for projecting a light beam along the axis of said lens system and on to said reflector, means for rotating the reflector about the axis of the lens system according to one variable, means for rotating the reflector about an axis perpendicular to the axis of the lens system according to another variable, a direction indicating graticule interposed in said light beam, and means for orientating the graticule about the axis of said lens system so that the graticule image will indicate the direction as well as the position.

4. In a navigational instrument a lens system, a reflector, means for projecting a light beam along the axis of said lens system and on to said reflector, means for rotating the reflector about the axis of the lens system according to one variable, means for rotating the reflector about an axis perpendicular to the axis of the lens system according to another variable, means for imparting a small additional rotation to said reflector about said perpendicular axis when the reflector is rotated about the lens system axis so as to give a linear trace to the rays projected by said reflector, a direction indicating graticule interposed in said light beam, and means for orientating the graticule about the axis of said lens system so that the graticule image will indicate the direction as well as the position.

JEFFERY WALTON BARNES.

REFERENCES CITED

The following references are of record in the file of this patent:

UNITED STATES PATENTS

| Number | Name | Date |
| --- | --- | --- |
| 1,412,997 | Bonneau et al. | Apr. 18, 1922 |
| 1,985,266 | Smith et al. | Dec. 25, 1934 |
| 2,115,568 | Becker | Apr. 26, 1938 |
| 2,143,011 | Johasz | Jan. 10, 1939 |
| 2,314,497 | Hargrave et al. | Mar. 23, 1943 |
| 2,395,351 | Sohn | Feb. 19, 1946 |
| 2,444,708 | Masner et al. | July 6, 1948 |
| 2,495,296 | Springer | Jan. 24, 1950 |